United States Patent [19]

Joyce et al.

[11] Patent Number: 5,417,324
[45] Date of Patent: May 23, 1995

[54] CLEAR MOLDED THERMOPLASTIC COMPACT DISC SUPPORTING TRAY

[75] Inventors: Michael P. Joyce, Kinnelon; Peter M. Russoniello, Lodi, both of N.J.

[73] Assignee: Joyce Development Corporation, Rockaway, N.J.

[21] Appl. No.: 225,149

[22] Filed: Apr. 8, 1994

[51] Int. Cl.⁶ .............................................. B65D 85/57
[52] U.S. Cl. ................................... 206/310; 206/307; 206/308; 206/309; 206/311; 206/312; 206/308.1
[58] Field of Search .............. 206/310, 309, 307, 308, 206/311, 312, 444

[56] References Cited

U.S. PATENT DOCUMENTS

| | | | |
|---|---|---|---|
| 4,702,369 | 10/1987 | Philosophe | 206/312 |
| 4,709,813 | 12/1987 | Wildt | 206/310 |
| 4,750,618 | 6/1988 | Schubert | 206/310 |
| 4,793,479 | 12/1988 | Otsuka et al. | 206/309 |
| 4,793,480 | 12/1988 | Gelardi et al. | 206/312 |
| 4,867,302 | 9/1989 | Takahashi | 206/45.13 |
| 4,874,085 | 10/1989 | Grobecker et al. | 206/309 |
| 4,903,829 | 2/1990 | Clemens | 206/310 |
| 5,011,010 | 4/1991 | Francis et al. | 206/307 |
| 5,101,971 | 4/1992 | Grobecker | 206/232 |
| 5,244,084 | 9/1993 | Chan | 206/309 |
| 5,244,085 | 9/1993 | Lammerant et al. | 206/310 |
| 5,246,107 | 9/1993 | Long et al. | 206/309 |
| 5,249,677 | 10/1993 | Lim | 206/310 |
| 5,259,498 | 11/1993 | Weisburn et al. | 206/45.15 |
| 5,263,580 | 11/1993 | Ciba et al. | 206/309 |
| 5,269,409 | 12/1993 | Brandt et al. | 206/309 |
| 5,284,243 | 2/1994 | Gelardi et al. | 206/310 |
| 5,285,893 | 2/1994 | Misterka et al. | 206/310 |

*Primary Examiner*—Jimmy G. Foster
*Assistant Examiner*—Tara L. Laster
*Attorney, Agent, or Firm*—William Squire

[57] ABSTRACT

A clear plastic box having a cover is hinged to a bottom member includes a relatively brittle clear (translucent or transparent) thermoplastic molded compact disc (CD) receiving tray, typically polystyrene. The tray has a central rosette of inwardly extending resilient fingers each with an outer radially facing recess for resiliently receiving the CD via a rim at the CD central opening. A plurality of molded ribs rigidify at least two pairs of opposing fingers to preclude breakage of the fingers during resilient displacement. The rigid fingers receive the CD in resilient deformation of either the fingers or CD or both without damage to the CD and fingers. All of the fingers may be rigid with a corresponding rib.

20 Claims, 2 Drawing Sheets

FIG. 1
FIG. 2
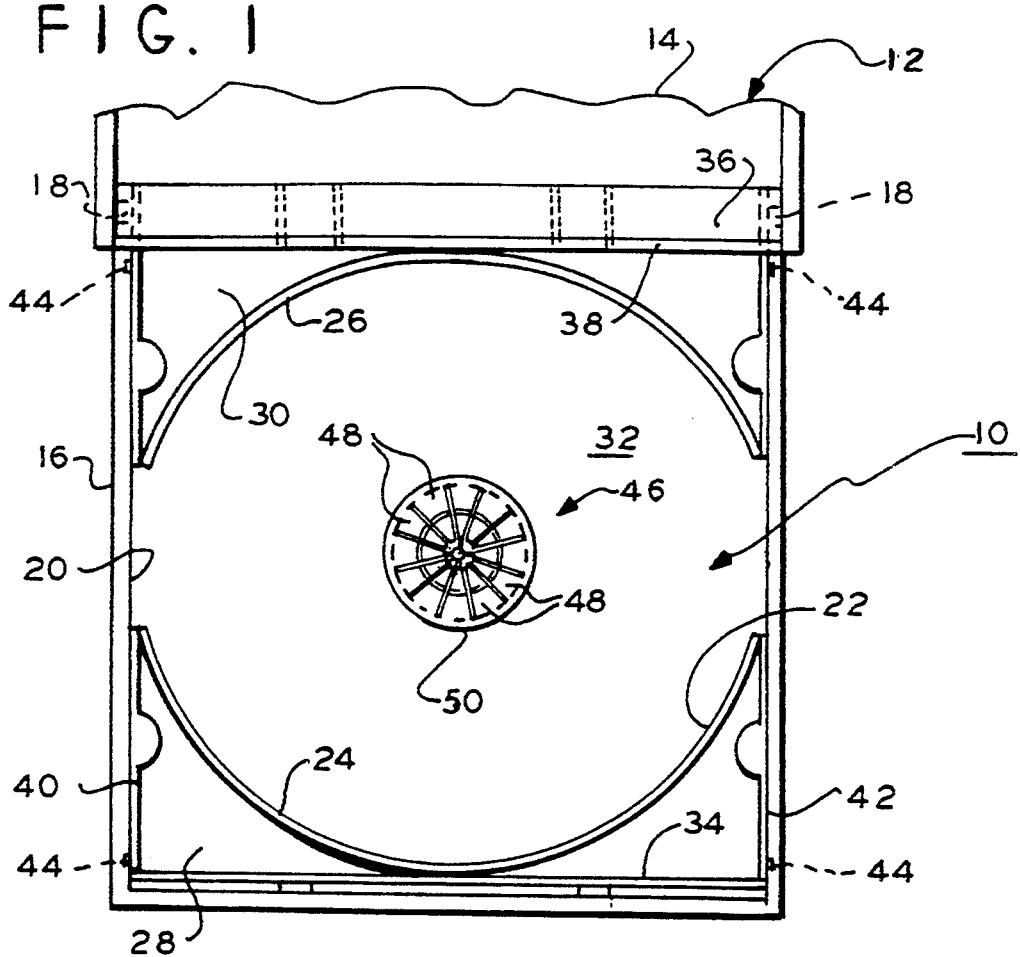
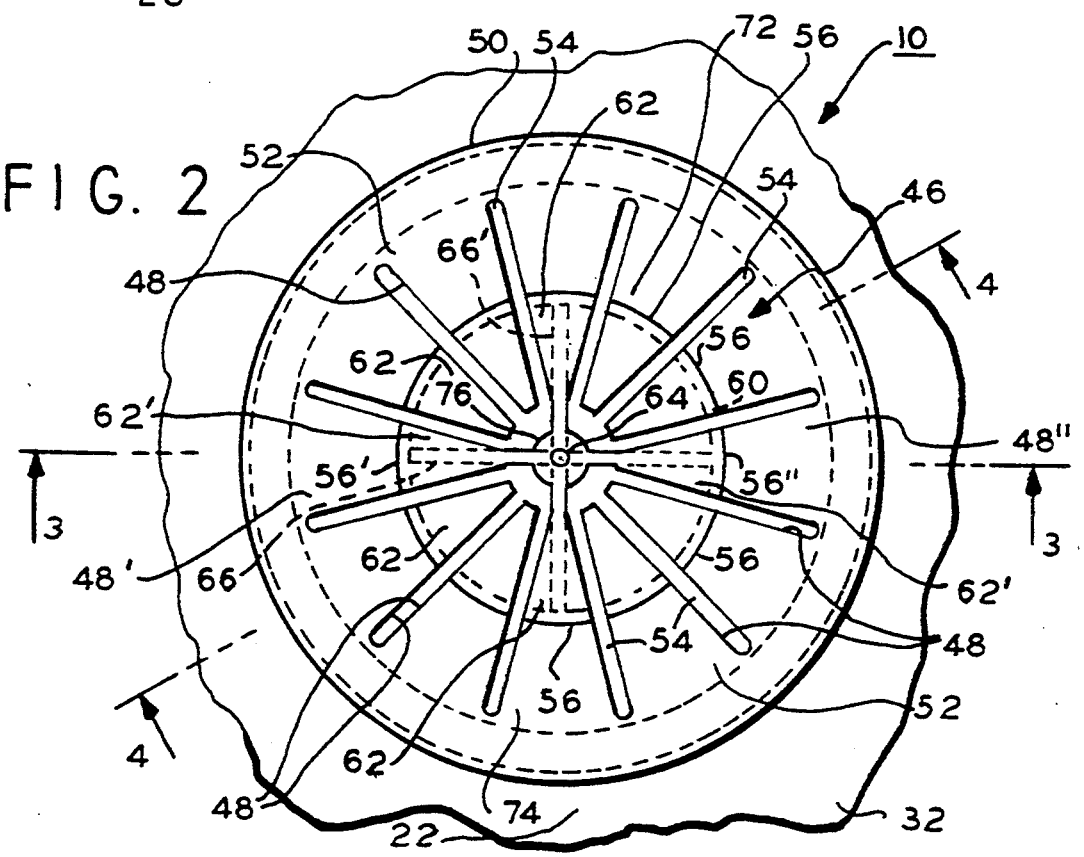

CLEAR MOLDED THERMOPLASTIC COMPACT DISC SUPPORTING TRAY

This invention relates to compact disc storage trays, and more particularly, to thermoplastic molded trays for securing a compact disc in a transparent compact disc storage package.

Compact discs are plastic circular discs which have recorded digital audio information on spiral tracks formed in a surface thereof. These discs are typically stored in a protective thermoplastic molded package comprising a bottom member and a cover hinged to the bottom member. The cover snaps to the bottom member in a closed position. A disc storage tray of molded thermoplastic, typically polystyrene, is snap fitted to the bottom member in the cavity of the bottom member. The tray has a circular array of inwardly extending cantilevered resilient fingers which include a radially outwardly facing concave shoulder between the finger tips and their outer ends at their cantilevered securing regions at which the fingers are attached and integral with the bottom member. The shoulders of the fingers are in an annular array to receive in interference fit the disc rim forming the central region opening. This interference fit resiliently bends the fingers inwardly toward one another to releasably secure the disc thereto. The fingers are cantilevered from a raised plateau formed in the bottom member so the secured disc is spaced from and parallel to the bottom member which has a circular cavity for receiving the secured disc.

The tray being polystyrene, which is relatively brittle, is loaded with rubber to minimize breakage of the resilient fingers when bent by the received disc. The rubber, however, is black, and colors the tray black. The remaining portions of the package including the cover and bottom member, in contrast, are transparent plastic. Polystyrene, without the rubber, is translucent or transparent, i.e., clear without color.

The present inventor recognizes a need for a clear disc tray which has a cosmetic appearance which is more pleasing with a clear package. The problem with the clear polystyrene tray is that the fingers for holding the disc in place lose their resiliency sufficiently so that the fingers tend to break at the junction of the shoulder with the tray bottom wall. The present invention provides a solution to this problem.

A tray according to the present invention secures a circular recording media thermoplastic sheet material disc, the disc having a circular central opening defined by an inner central disc rim. The tray comprises a molded relatively brittle thermoplastic frame comprising a wall arranged to receive the disc in overlying relation and at least one molded thermoplastic member integral with, upstanding from and of the same material as the frame and forming at least one radially outwardly facing shoulder on opposing sides of the member for receiving and releasably securing thereto the central disc rim.

In accordance with a further embodiment, the at least one shoulder is formed with means to snap fit receive the disc rim thereagainst.

In a still further embodiment, the at least one shoulder is annular and the means to snap receive the rim comprises a plurality of radially outwardly facing annularly spaced concave recesses in the shoulder.

A compact disc tray according to a further embodiment of the present invention comprises a clear molded relatively brittle thermoplastic frame comprising a wall arranged to receive the disc in overlying relation. An annular array of clear thermoplastic molded resilient fingers are integral with and cantilevered from the frame at a first annular region, the fingers extending radially inwardly toward one another from the region to form a rosette of cantilevered fingers with a central array of spaced finger tips, a plurality of the fingers having an annular shoulder for receiving the disc central opening. Rib means are secured to a first plurality of the fingers to substantially rigidify the first plurality of fingers while substantially permitting the outer shoulders to receive and secure the disc at the disc central opening in snap fit relation.

The frame wall according to an embodiment of the present invention is planar at the first annular region, the fingers each including a first portion extending radially inwardly, a second portion forming the outer step upstanding from the first portion and a third portion extending radially inwardly from the second portion in a plane spaced form the first portion, the rib means comprising a first rib member secured to and integral with a pair of opposing fingers including the second and third portions of the pair of fingers.

The frame wall according to a further embodiment is polystyrene.

IN THE DRAWING

FIG. 1 is a fragmented plan view of a compact disc storage tray and package according to one embodiment of the present invention;

FIG. 2 is a more detailed enlarged view of the disc securing fingers of the embodiment of FIG. 1:

Figure 5:
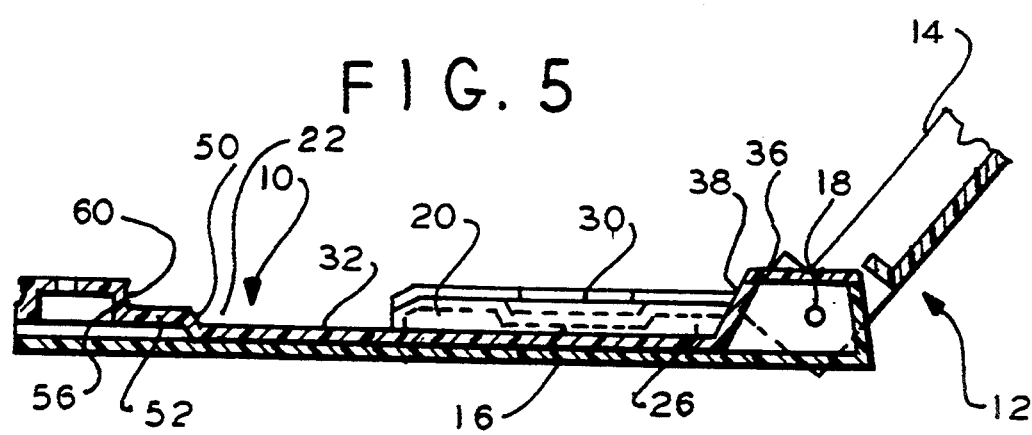
FIG. 5 is a fragmented sectional elevation view of the embodiment of FIG. 1.

In FIGS. 1 and 5, rectangular tray 10 for receiving a compact disc, according to an embodiment of the present invention, is installed in a clear compact disc housing package 12. Package 12 comprises a rectangular thermoplastic cover 14 hinged via hinges 18 at one end to an end of a rectangular thermoplastic bottom member 16. The cover 14 snap fits over and to the bottom member 16 to enclose the tray 10 in a rectangular cavity 20 formed by the cover and bottom member. The package 12 is sometimes referred to as a "jewel box." The package 12 protects the compact disc (not shown) secured therein from the ambient conditions including dust, dirt and excessive handling. The disc comprises information recorded in a spiral digital encoded track formed in one side of a thin circular metal disc substrate encased within a protective circular relatively thin transparent plastic casing. The disc has a circular outer periphery and a central circular concentric opening. The disc is secured to the tray via the disc rim at the central opening.

In FIG. 1, the tray 10 comprises a rectangular relatively thin member which is conformal with the shape of cavity 20 and is closely received in the cavity 20. The tray 10 is formed of clear molded thermoplastic relatively brittle material such as polystyrene. The term "clear" as used herein includes both translucent and transparent material free of filler material which tends to make the tray opaque such as rubber as employed in prior art trays. The tray 10 is planar molded sheet material formed with a circular recess 22 formed by two opposing circular segment sides 24 and 26 depending from respective planar walls 28 and 30. Recess 22 has a planar bottom wall 32.

A linear rib 34 upstands from wall 28 transversely across the tray 10 at one end of the tray 10. A flange 36 extends outwardly from wall 30 via a linearly transversely extending upstanding rib 38 at the opposite end of the tray, the ribs 34 and 38 extending along the shorter side of the rectangle formed by tray 10. The ribs 24, 26 and 38 incline slightly upward and away from bottom wall 32. Further reinforcing ribs (not shown) are included to strengthen the ribs 38 and 34. Other ribs (not shown) depend from walls 28 and 30 along the longitudinal sides 40 and 42 of the tray 10. A projection 44 extends from the sides 40 and 42 at the corners of the tray 10 to snap fit attach the tray to the package 12 bottom member 16. The tray described thus far is structurally identical with prior art trays except prior art trays are not clear thermoplastic, but rubber loaded black plastic to make the material of the tray resilient. Tray 10 in contrast is not loaded with filler rubber and is thus clear and more closely matches the material of the cover 14 and bottom member 16.

Centrally molded with and in bottom wall 32 is a rosette 46 of fingers 48, FIGS. 1 and 2. The bottom wall 32 is molded with a central circular rib 50 which upstands from wall 32 into recess 22. Rib 50 is concentric with walls 24 and 26, FIG. 1. In FIG. 2, a circular disc-like planar wall 52 extends radially inwardly from rib 50 parallel to bottom wall 32, the walls 32 and 52 being of the same thickness and molded integrally as one unit. A plurality of inwardly extending radial slots 54 of the about same transverse width and length are formed in wall 52 to form the radially inwardly extending fingers 48.

Each finger 48 includes a shoulder 56 upstanding from wall 52 and which is a circular segment in plan view, FIG. 2. The radially outwardly facing external surface of each shoulder 56 is concave formed by a recess 60. The recesses 60 of the shoulders 56 lie in a plane parallel to the plane of the walls 32 and 52. The recesses 60 of all the shoulders 56 form a plurality of annularly spaced coplanar concavities which together form in plan view a circular radially outwardly facing recess. The fingers 48 each further include a tip portion 62 cantilevered radially inwardly from the shoulder 56. The tip portions 62 of opposite fingers extend toward one another, the fingers being spaced at 30° conventional type. The fingers each subtend an arc less than 30° to allow for the slots 54. The fingers are triangular in plan view and normally are radially resilient in a direction toward and away from opposing fingers in the rosette 46 except as provided herein. Typically, the fingers 48 bend in the wall 52.

Figure 3:
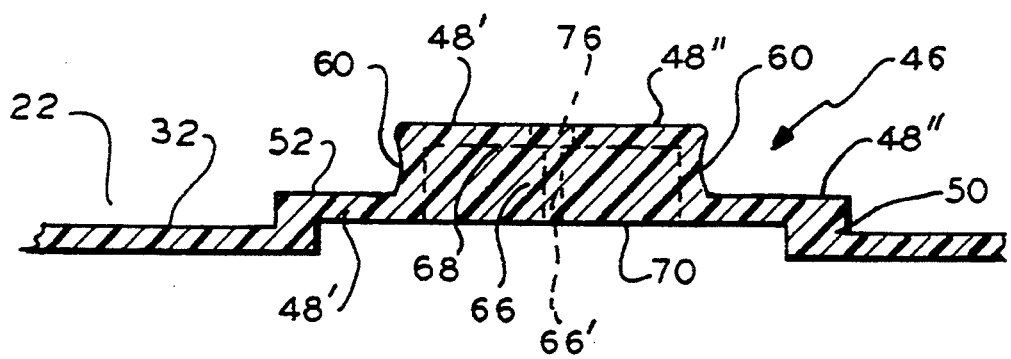
FIGS. 3 AND 4 are elevation section views of the embodiment of FIG. 2 taken along respective lines 3—3 and 4—4.
Figure 4:
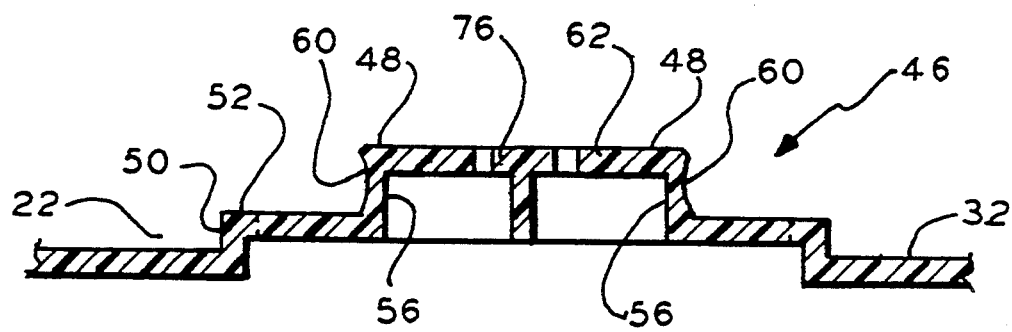

In FIGS. 2 and 3, opposing fingers such as fingers 48' and 48" at their respective tip portions 62' and 62" are molded integral with a planar rib 66 extending from respective shoulders 56' to 56". The plane of the rib 66 is normal to the plane of the fingers 48, 48' and 48". The upper portion 68 of the rib is integral with the fingers 48' and 48". The rib 66 has a lower edge 70 which is coplanar with the lower surface of the bottom wall 52. The rib 66 in plan view, FIG. 2, has a transverse width (from the top to the bottom of the drawing figure) of about the same dimension as the extreme tip end of the tip portion 62 of fingers 48' and 48". The rib 66 extends across the center 64 of the rosette.

A second rib 66', FIG. 2, identical to rib 66 is integral with fingers 72 and 74 aligned normal to the alignment of fingers 48' and 48". Rib 66' is integral with fingers 72 and 74 in an identical manner as rib 66 to fingers 48' and 48". The two ribs 66 and 66' meet at center 64 and are integrally connected by a circular molded disc 76 which is coplanar with and of about the same thickness as the finger tip portions 62. The lower portion of the ribs 66 and 66' beneath the disc 76 are integral at their intersection. The disc 76 is optional and in the alternative may extend for the full length of the ribs 66 and 66' between the fingers and the lower rib edges 70.

The ribs 66 and 66' thus rigidify the fingers 48', 48", 72 and 74 making them immobile. While two ribs are shown, further ribs such as ribs 66 and 66' may be used to interconnect further opposing finger pairs or all of the fingers 48 in identical fashion to thereby rigidify all of the fingers. Applicant has discovered that by making the fingers rigid, the compact disc (not shown) inner rim engaging the shoulders 56 is able to snap fit engage the recesses 60 apparently due to resilient deformation of either or both the fingers and the compact disc rim, which is also thermoplastic material. Previously, it was believed that the compact disc material also made of relatively brittle material might break when subject to the stress of elastic deformation when forced into interference fit with the recesses 60. Applicant has discovered that the discs are able to engage the shoulders 56 without damage. This is significant.

By providing a plurality of ribs 66 for interconnecting all of the fingers in the rosette 46 as described, the recesses 60 are angularly spaced in equal angular increments about the center 64, FIG. 2. The corresponding shoulders by resilient deformation secure the CD disc thereto without fracturing either the relatively brittle fingers or the CD disc. In the alternative, it will occur that the fingers may be eliminated and replaced by a circular upstanding cylindrical member with an outer annular recess therein corresponding to recesses 60. In this case, the amount of interference fit in the radial direction to form a resilient deformation snap fit with the CD disc may be reduced from that used with the fingers to preclude stress cracking the CD disc due to the greater annular contact area of the continuous shoulder interference with the CD disc. The amount of interference fit with the fingers 48 is the same as used in the prior art disc trays as are presently commercially available. The difference is the addition of the ribs such as ribs 66 and 66'. The use of fingers or their equivalents with reinforcing ribs is preferred over a solid central cylindrical member. By way of example, a solid central cylindrical member may have an outer peripheral surface formed with annularly spaced recesses such as recesses 60. Also, the fingers need not be triangular when made rigid by a rib such as rib 66, the ribs being employed in place of the fingers.

It will occur that various other modifications may be made to the described embodiments by one of ordinary skill in this art, which embodiments are given by way of illustration and not limitation. For example while a clear plastic is preferred, it will occur that colored plastics may also be used whether clear or opaque to color coordinate the tray to the package. The scope of the invention is as defined in the appended claims.

What is claimed is:

1. A tray for securing a circular recording media compact disc, the disc having a circular central opening, said tray comprising:

a molded thermoplastic frame comprising a wall arranged to receive the disc in overlying relation;

an annular array of thermoplastic molded resilient fingers integral with and cantilevered from the frame at a first annular region, the fingers extending radially inwardly toward one another from the region to form a rosette of cantilevered fingers with a central array of spaced finger tips, a plurality of said fingers each having a annular shoulder dimensioned for receiving and releasably securing the disc thereto at the disc central opening; and rib means secured to a first plurality of said fingers to substantially rigidify said first plurality of fingers while substantially permitting the shoulders thereof to receive and secure said disc at said disc central opening in snap fit relation.

2. The tray of claim 1 wherein said first plurality of fingers includes at least two opposing fingers.

3. The tray of claim 1 wherein the first plurality of fingers includes two pairs of opposing fingers.

4. The tray of claim 1 wherein the frame wall is planar at the first annular region, said fingers each including a first portion extending radially inwardly, a second portion forming said shoulder upstanding from said first portion and a third portion extending radially inwardly from said second portion in a plane spaced form the first portion, said rib means comprising a first rib member secured to and integral with a pair of opposing fingers including the second and third portions of said pair of fingers.

5. The tray of claim 4 wherein the rib means includes a further rib member secured to and integral with a second pair of opposing fingers such that the first and further rib members intersect and are integral in the region of said rosette between said finger tips.

6. The tray of claim 5 including a third rib member connecting a third pair of opposing fingers, all said rib members intersecting and integral in said region of said rosette between said finger tips.

7. The tray of claim 2 wherein the wall defines a cavity having a planar portion for receiving said disc and the fingers are each planar with the planes thereof parallel to the plane of the wall at a region of the fingers between said tips and said shoulders, said rib means comprising a planar member normal to the plane of said fingers and secured to and integral with said opposing fingers at and between said shoulders and tips.

8. The tray of claim 7 wherein the wall includes a central annular portion lying in a plane spaced from the plane of the planar portion, said fingers each being formed in said wall annular portion, said rib member having an edge thereof coplanar with a surface of said annular portion.

9. The tray of claim 1 wherein the frame is formed of clear thermoplastic material.

10. The tray of claim 1 wherein the frame is formed of colored thermoplastic material.

11. The tray of claim 1 wherein the shoulder has an outer concave recess.

12. A compact disc tray for securing a recording media compact disc in a package having a bottom member and a cover hinged to the member for storing the disc therebetween, the disc having a circular central opening, said tray comprising:

a molded thermoplastic frame comprising a wall having an annular cavity arranged to receive the disc in overlying relation and including means for securing the frame to the bottom member between the member and cover;

an annular array of thermoplastic molded resilient fingers integral with and cantilevered from the frame in said cavity at a first annular region, the fingers extending radially inwardly toward one another from the region to form a rosette of cantilevered fingers with a central array of finger tips, each said fingers including a shoulder for receiving the disc central opening in said cavity, said fingers including means for spacing the disc from said wall in said cavity; and rib means secured to the tips of and integral with a first plurality of said fingers to substantially rigidify said first plurality of fingers while substantially permitting the shoulders to receive and secure said disc at said disc central opening in snap fit relation.

13. The tray of claim 12 wherein said first plurality of fingers includes at least two opposing fingers.

14. The tray of claim 13 wherein the cavity has a planar portion for receiving said disc and the fingers are each planar with the planes thereof parallel to the plane of the wall at a region of the fingers between said tips and said shoulders and at a region between the shoulders and finger ends distal said tips adjacent to said wall, said rib means comprising a member secured to and integral with said opposing fingers at and between said shoulders and tips.

15. The tray of claim 14 including at least two pairs of said opposing fingers, said rib means including a planar member corresponding to, normal to and integral with each said two pairs, the planar members of said at least two pairs intersecting and integral in a central region between said finger tips.

16. A tray for securing a circular recording media compact disc, said tray comprising:

a plate with a central opening;

an annular array of fingers extending radially inwardly in said opening;

a shoulder upstanding from each said fingers;

a finger tip extending radially inwardly from each said shoulders; and a rib interconnecting at least two of said finger tips.

17. The tray of claim 16 wherein the fingers each have an inner end, each of the shoulders upstanding from said inner end of the corresponding finger.

18. The tray of claim 16 wherein said at least two finger tips extend toward one another in opposing relation.

19. The tray of claim 18 including a plurality of pairs of opposing finger tips.

20. The tray of claim 16 wherein said rib further interconnects the shoulders corresponding to said at least two finger tips.

* * * * *

UNITED STATES PATENT AND TRADEMARK OFFICE
CERTIFICATE OF CORRECTION

PATENT NO. : 5,417,324
DATED : May 23, 1995
INVENTOR(S) : Joyce et al

It is certified that error appears in the above-indentified patent and that said Letters Patent is hereby corrected as shown below:

Column 4, line 40, delete "."(period).

Column 5, line 9, delete "annular".

Signed and Sealed this

Twenty-second Day of August, 1995

Attest:

BRUCE LEHMAN

Attesting Officer     Commissioner of Patents and Trademarks